US010532507B2

(12) United States Patent
Zikeli et al.

(10) Patent No.: US 10,532,507 B2
(45) Date of Patent: Jan. 14, 2020

(54) METHOD FOR THE PURIFICATION OF A FLUID AND FILTERING DEVICE

(71) Applicant: AUROTEC GMBH, Regau (AT)

(72) Inventors: Stefan Zikeli, Regau (AT); Michael Longin, Seewalchen am Attersee (AT); Friedrich Ecker, Timelkam (AT); Klaus Weidinger, Lenzing (AT)

(73) Assignee: AUROTEC GMBH, Regau (AT)

( * ) Notice: Subject to any disclaimer, the term of this patent is extended or adjusted under 35 U.S.C. 154(b) by 160 days.

(21) Appl. No.: 14/649,942

(22) PCT Filed: Dec. 5, 2013

(86) PCT No.: PCT/AT2013/000196
§ 371 (c)(1),
(2) Date: Jun. 5, 2015

(87) PCT Pub. No.: WO2014/085836
PCT Pub. Date: Jun. 12, 2014

(65) Prior Publication Data
US 2015/0328816 A1     Nov. 19, 2015

(30) Foreign Application Priority Data
Dec. 6, 2012 (EP) .................................. 12195894

(51) Int. Cl.
*B29C 48/691* (2019.01)
*B01D 35/30* (2006.01)
(Continued)

(52) U.S. Cl.
CPC .......... *B29C 48/6914* (2019.02); *B01D 29/52* (2013.01); *B01D 29/66* (2013.01); *B01D 29/96* (2013.01); *B01D 35/306* (2013.01)

(58) Field of Classification Search
CPC .......... B29C 47/683; B29C 47/68–688; B01D 35/306; B01D 29/96; B01D 29/52; B01D 29/66; B01D 35/30
See application file for complete search history.

(56) References Cited

U.S. PATENT DOCUMENTS

| 4,752,386 A | 6/1988 | Schulz et al. |
| 4,849,113 A * | 7/1989 | Hills ..................... B01D 29/09 |
| | | 210/106 |

(Continued)

FOREIGN PATENT DOCUMENTS

| DE | 9418880 | 1/1995 |
| DE | 19500060 | 11/1995 |

(Continued)

OTHER PUBLICATIONS

Stude DE 19800744 (machine translation and original attached).*

(Continued)

*Primary Examiner* — Liam Royce
(74) *Attorney, Agent, or Firm* — Greer, Burns & Crain, Ltd.

(57) ABSTRACT

A method and a device for cleaning a fluid is provided, the device including a housing having at least one inlet and at least one outlet, and a slide mechanism which is movable in the housing and has at least one passage having at least two filters lying substantially symmetrically opposite each other, wherein starting from the housing inlet the fluid flows symmetrically onto the filters in the passage and downstream of the filters is directed to the outlet of the housing, wherein a part of the fluid that does not flow through the passage forms a hydrodynamic buffer in a gap between the slide mechanism and the housing, wherein the passage opens out into at least two symmetrically opposite sub-channels of the outlet and at least four flushing flows are (Continued)

generated in the gap between at least two inlet mouths and at least two outlet mouths of the passage.

18 Claims, 13 Drawing Sheets

(51) Int. Cl.
*B01D 29/52* (2006.01)
*B01D 29/66* (2006.01)
*B01D 29/96* (2006.01)

(56) References Cited

U.S. PATENT DOCUMENTS

| | | |
|---|---|---|
| 4,973,406 A | 11/1990 | Ponzielli |
| 5,032,267 A | 7/1991 | Petschner |
| 5,358,143 A * | 10/1994 | Perry ............... B29C 47/92 222/1 |
| 5,417,856 A | 5/1995 | Bacher et al. |
| 5,439,589 A * | 8/1995 | Whitman ............... B01D 29/01 210/436 |
| 5,578,206 A * | 11/1996 | Ogoshi ............... B01D 29/01 210/236 |
| 5,795,488 A | 8/1998 | Kalt et al. |
| 5,922,194 A | 7/1999 | Bruckmann et al. |
| 7,976,706 B2 | 7/2011 | Gneuss |
| 2014/0263028 A1 * | 9/2014 | Middler ............... B01D 29/68 210/333.01 |

FOREIGN PATENT DOCUMENTS

| | | | |
|---|---|---|---|
| DE | 19800744 A1 * | 5/1999 | ............ B01D 35/14 |
| EP | 0922558 | 6/1999 | |
| JP | S53-32867 U | 3/1978 | |
| WO | 9822198 | 5/1998 | |
| WO | 9841305 | 9/1998 | |
| WO | 0216113 | 2/2002 | |
| WO | WO 2013000772 A1 * | 1/2013 | ......... B29C 47/0886 |

OTHER PUBLICATIONS

Hangmann WO 02016113 (machine translation and original attached).*
Chinese Office Action from Corresponding Chinese Patent Application No. 201380069687.8, dated Jan. 4, 2016.

* cited by examiner

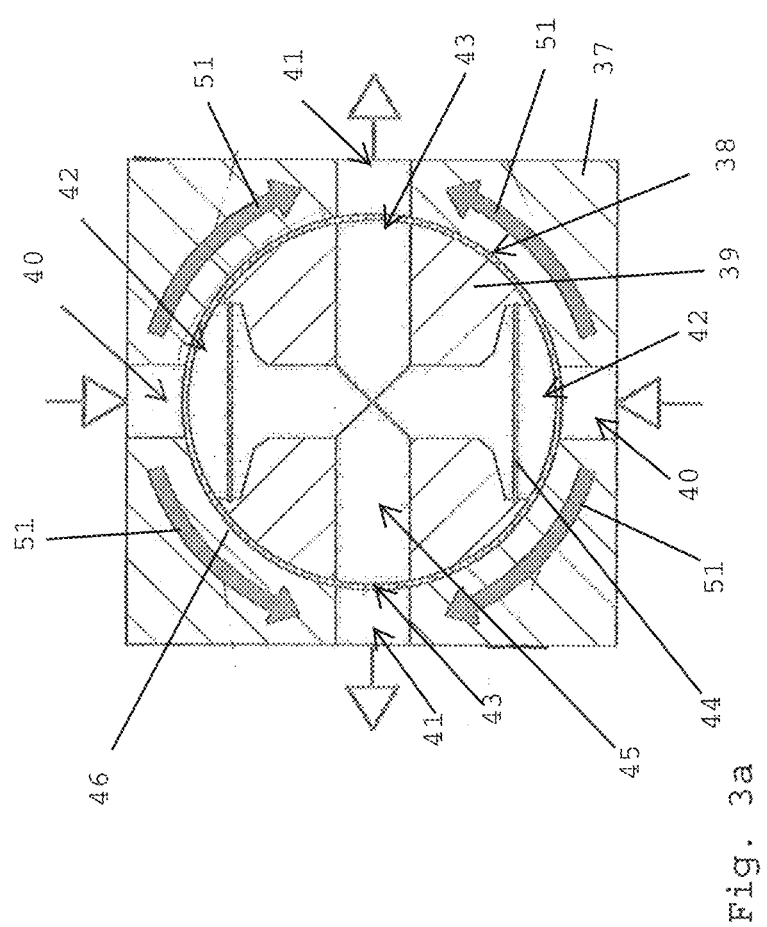

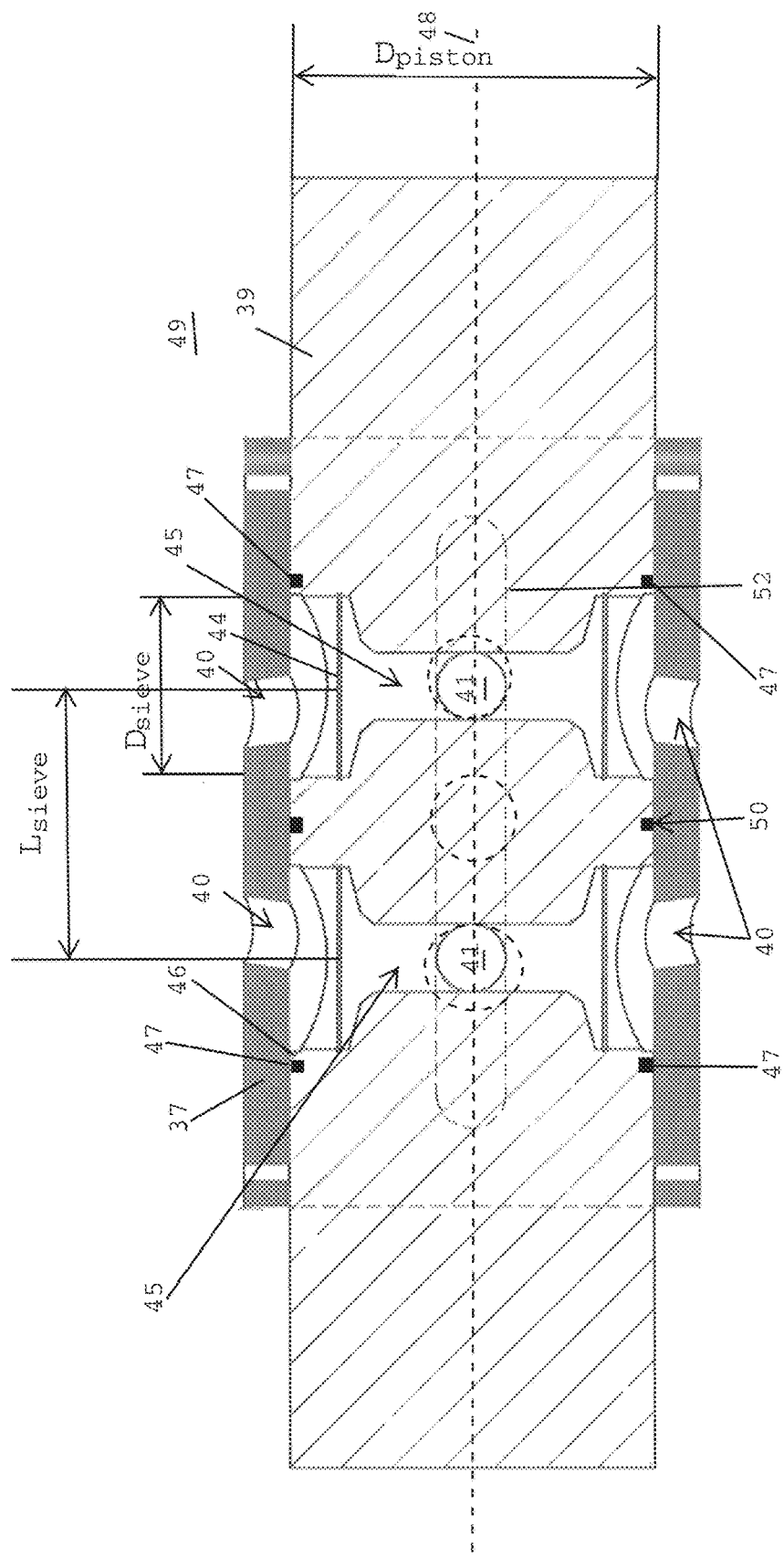

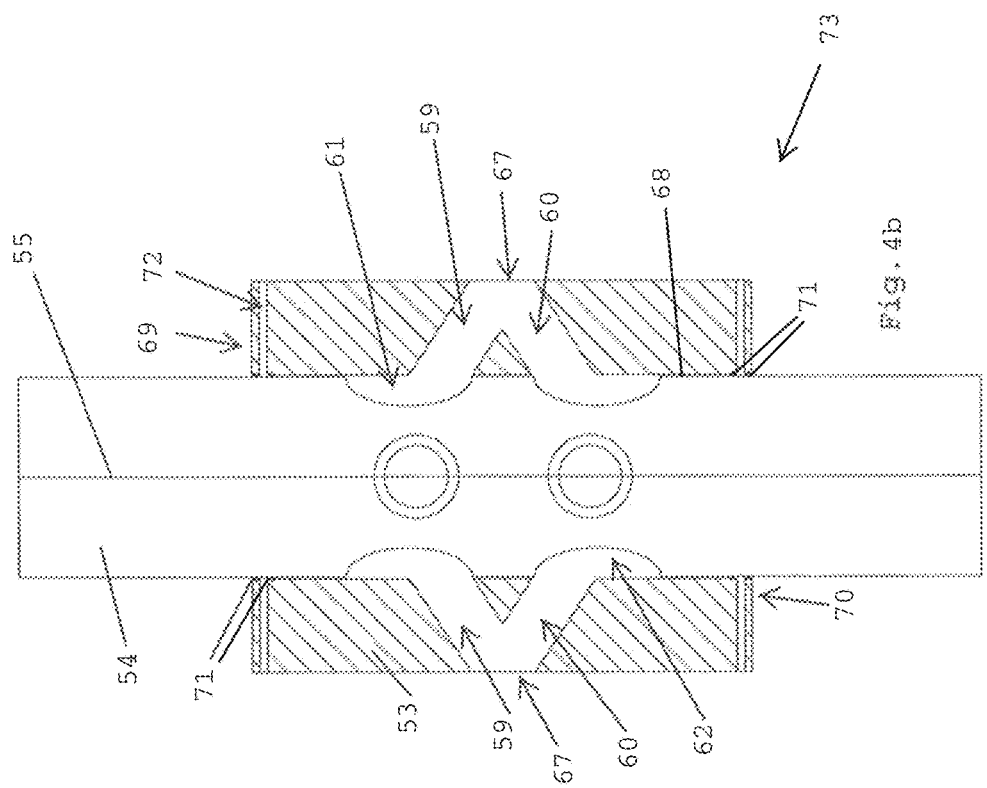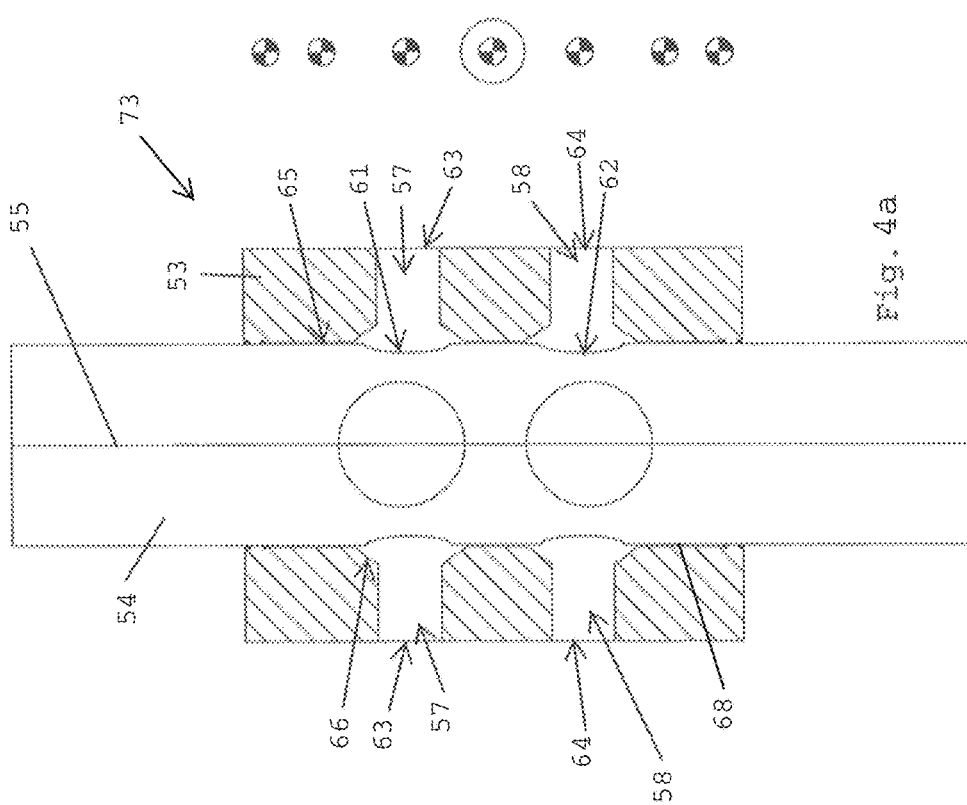

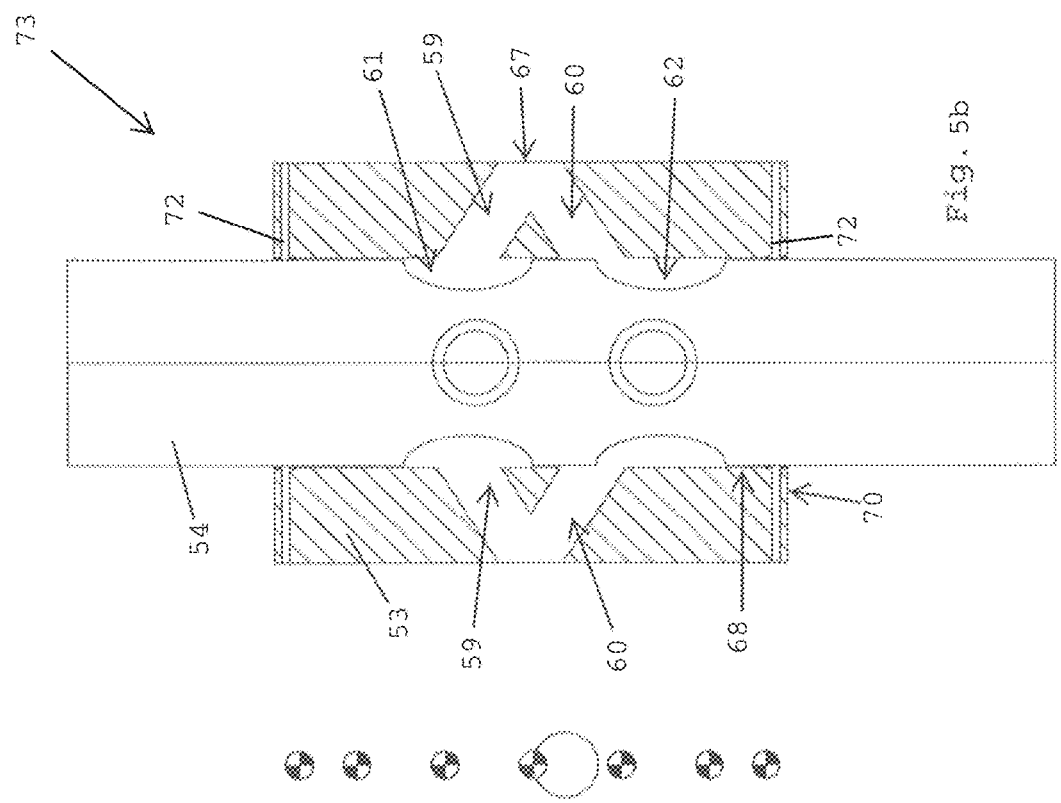
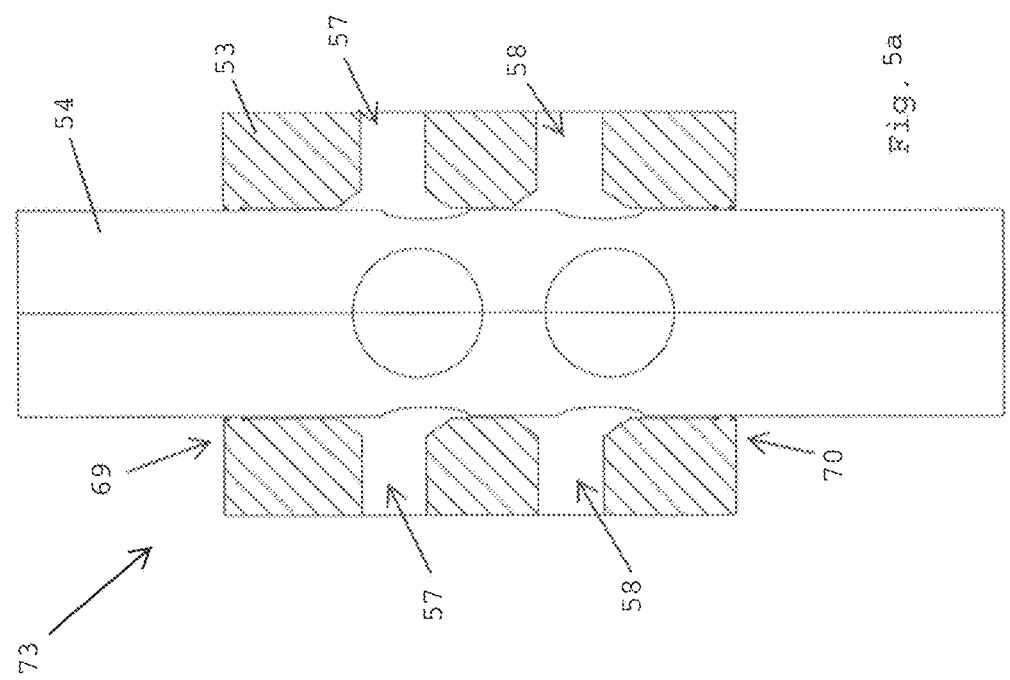

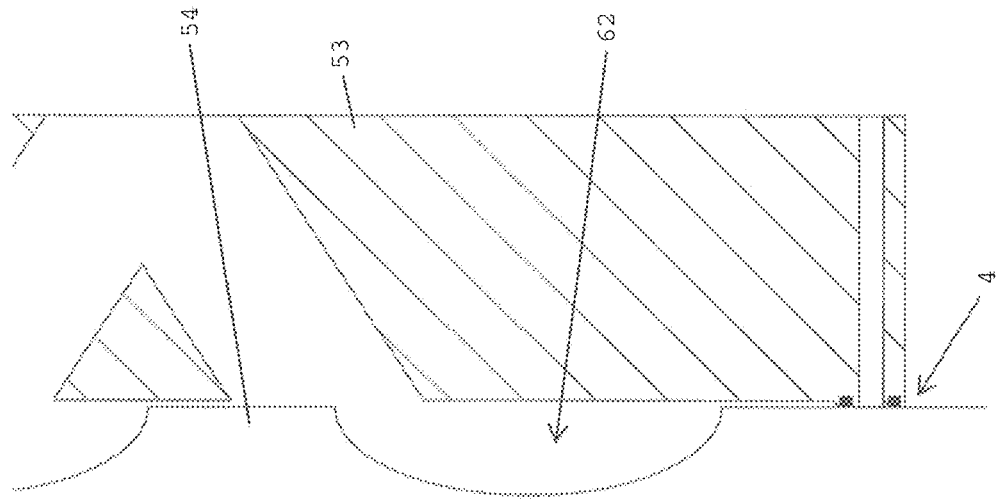
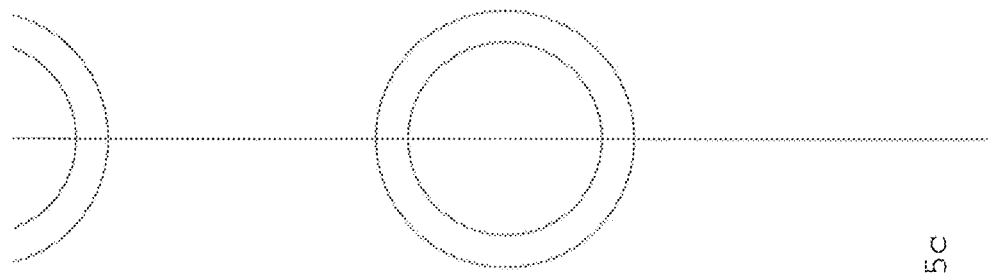
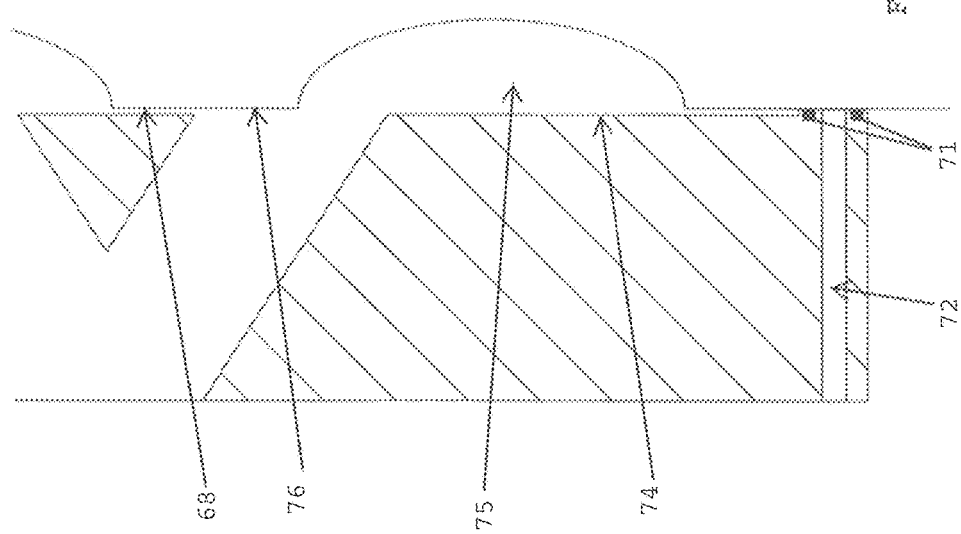
Fig. 5C

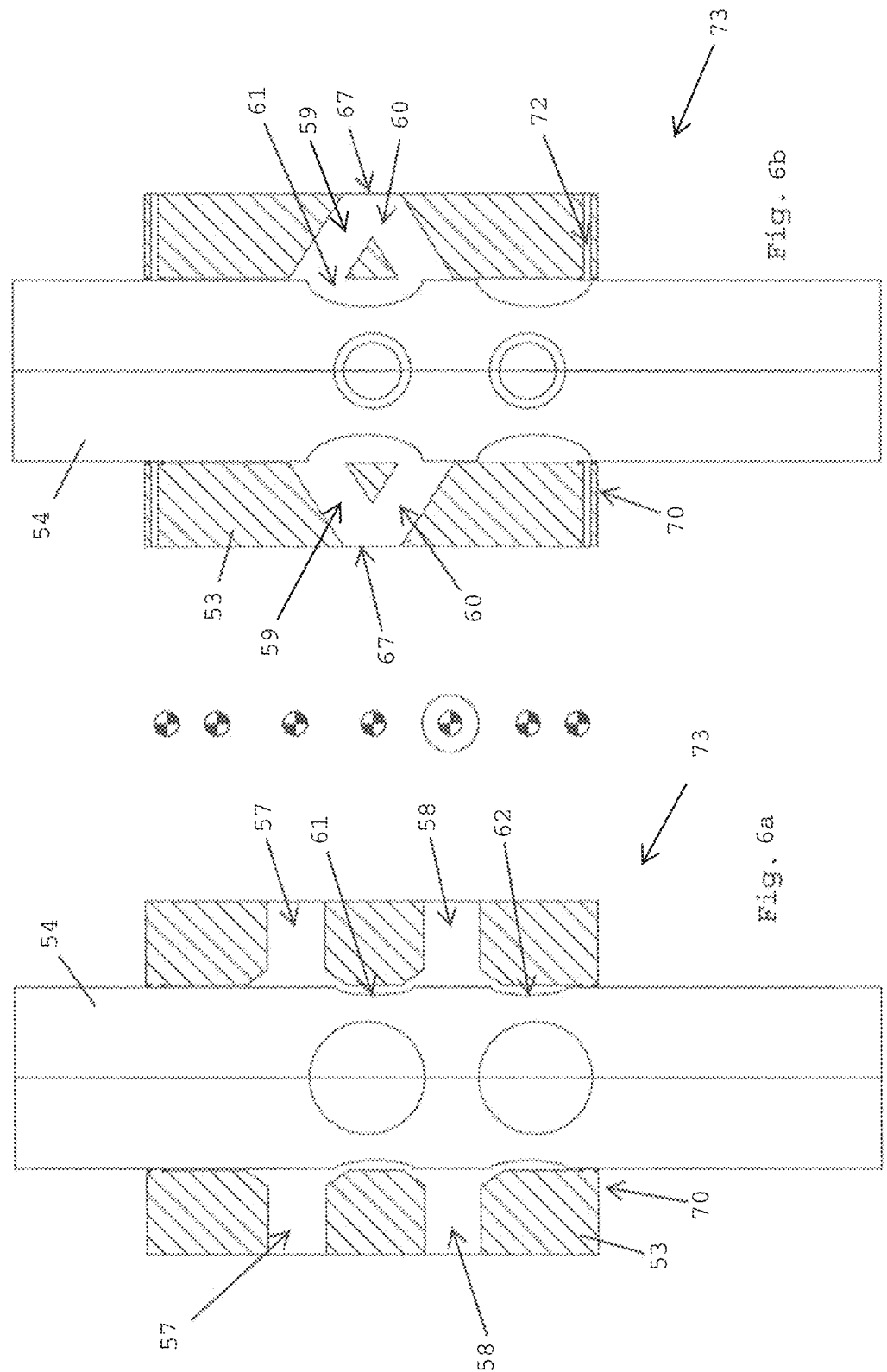

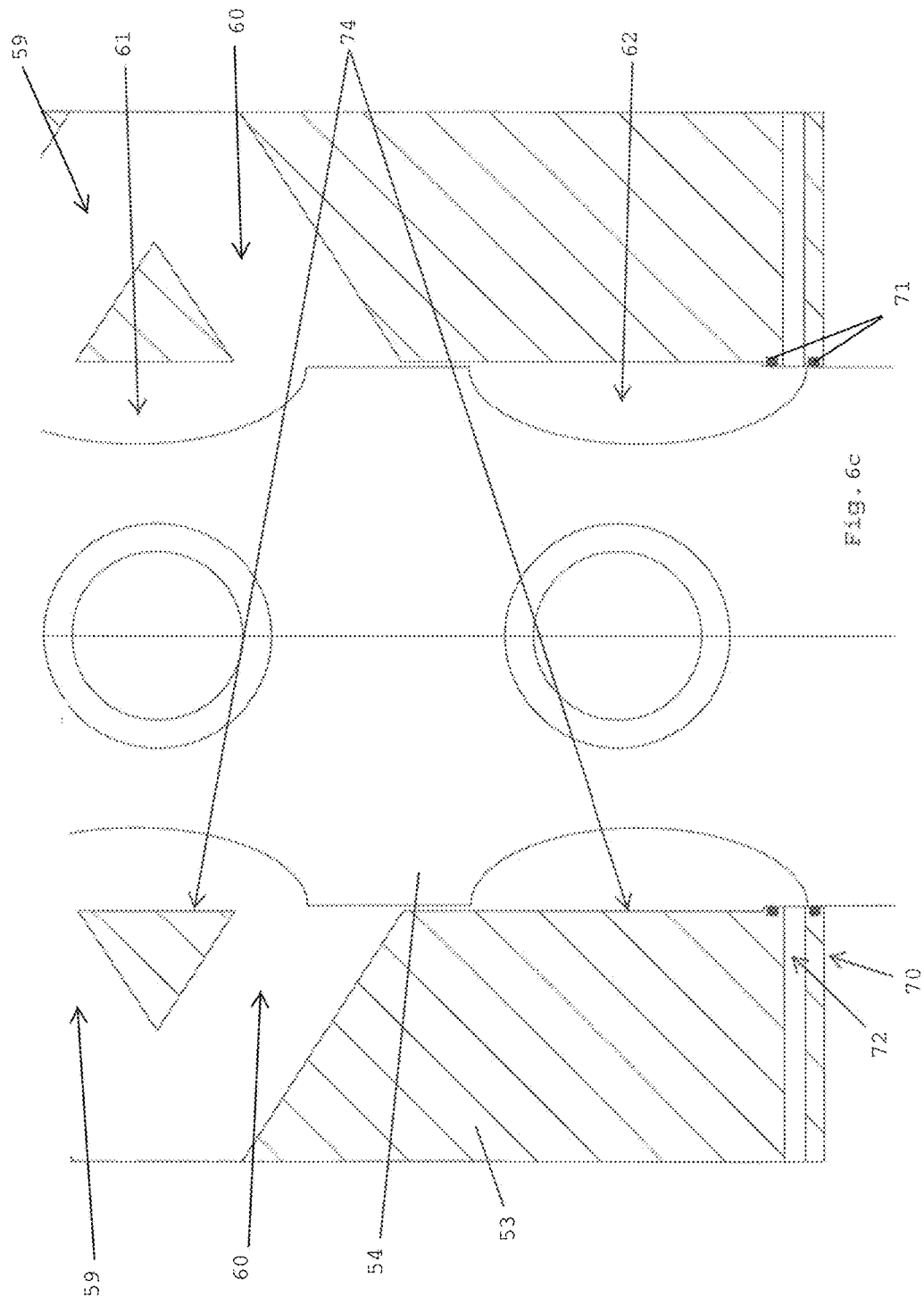

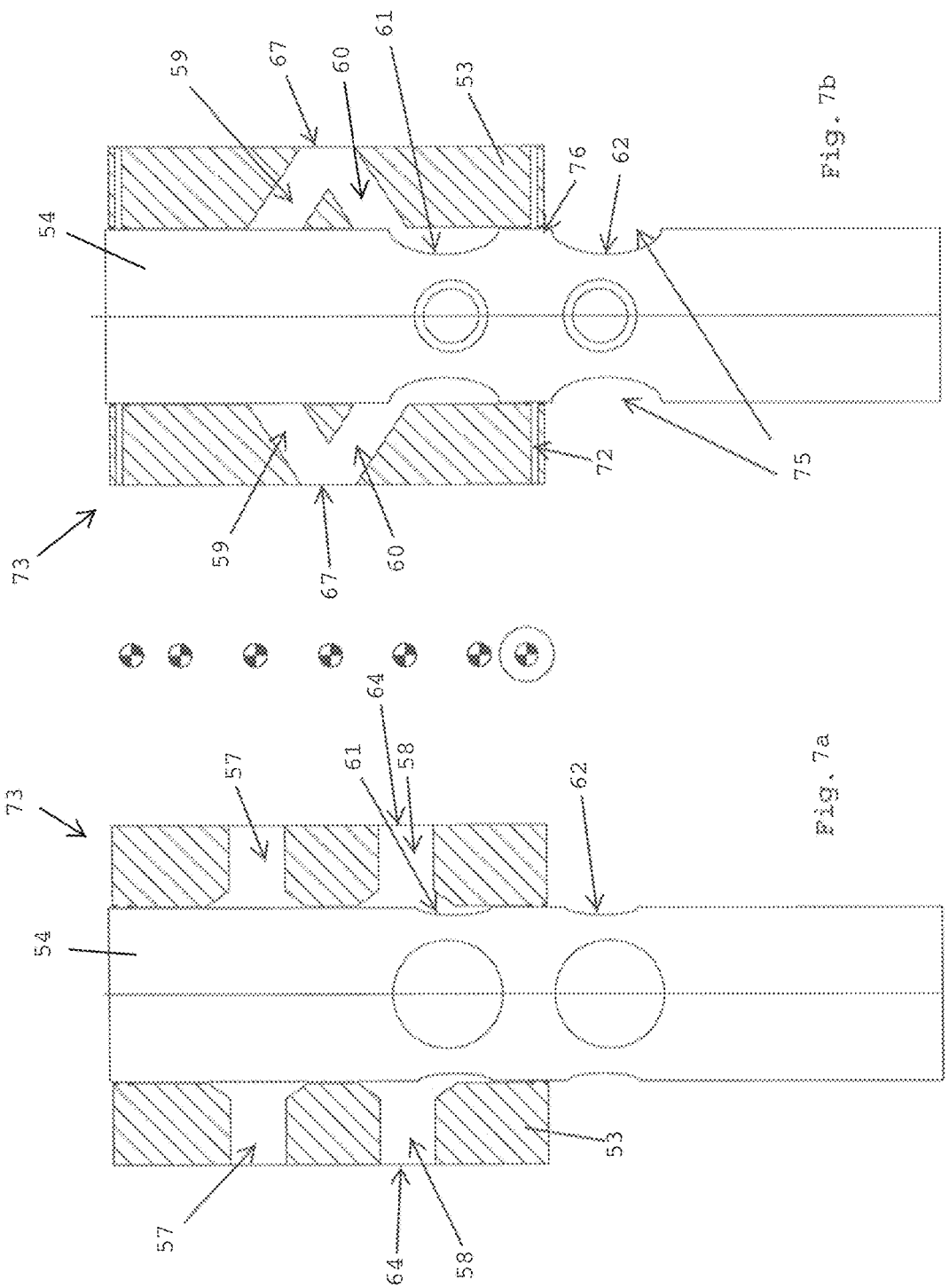

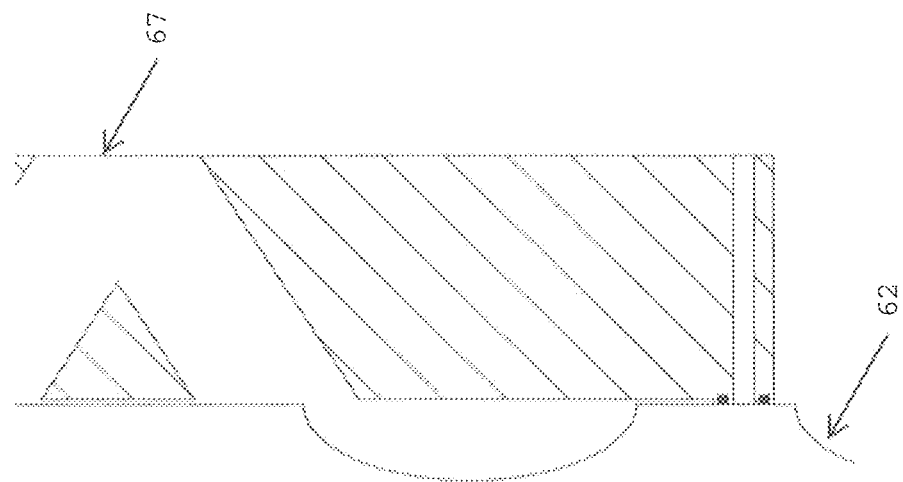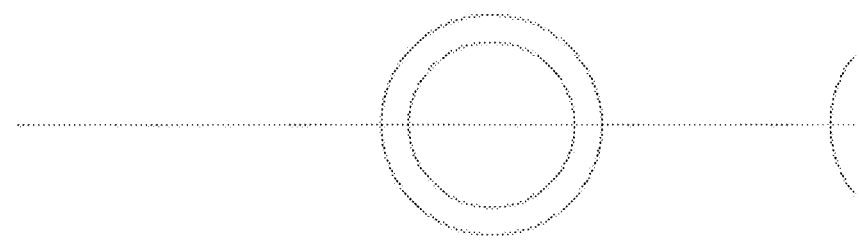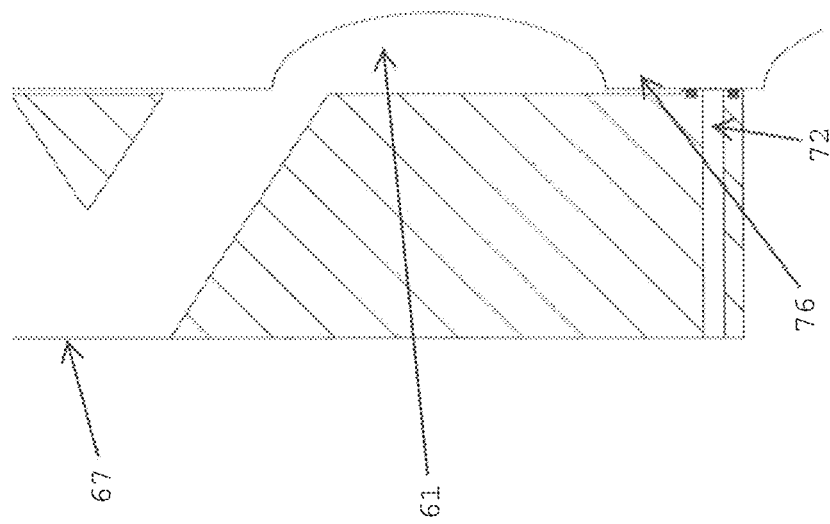
Fig. 7c

METHOD FOR THE PURIFICATION OF A FLUID AND FILTERING DEVICE

BACKGROUND

The present invention relates to a method for the purification of a fluid and a filtering device with mechanisms for simple maintenance and filter replacement.

Conventional filtering devices essentially comprise a housing with an inlet and outlet for the polluted and the filtered fluid respectively, a filter carrier body which is received displaceably in the housing, and a filter which is located in the filter carrier body. If the filter is clogged, it has to be replaced or cleaned. For this purpose, the filter carrier body is displaced in the housing in such a way that, for example, the inlet of the filter carrier body is closed and the area of the filter carrier body that comprises the filter arrives at a position accessible for cleaning. Afterward, the filter carrier body is displaced again back into its initial position.

Filter replacement systems for plastic melts are described in patent publication EP 0 314 024 A2 and in DE 195 00 060 C, wherein chambers, which each have two mounted filters and are located on a slide, change between positions for filtration and back-flushing of a filter via back-flow channels. Special passages and a long channel are required in the slide in order to be able to react to each position of the slide. This may lead to the formation of dead spaces and more difficult guidance of the slide. In the case where thermally unstable fluids are filtered, decomposition may occur here with the formation of undesired or hazardous decomposition products.

WO 92/16351 describes a simple system for the optional back-flushing of a filter by displacing a filter block between an outlet position and an inlet position. This system lacks a filter replacement position that enables parallel further filtering, as has already been described in EP 0 314 024 A2.

WO 98/22198 A1 shows a filtering system with a housing split up into two parts, wherein the two housing parts are spaced apart from one another in such a way that the filter can be brought by displacement of the piston into a position accessible from the exterior between the housing parts. In this position and also in a back-flushing position, parallel further filtering is however not possible. Between the piston and the two housing parts, spinning compound constantly exits from the housing to the exterior through a total of three annular gaps. According to WO 98/22198 A1, therefore, a flushing flow is not formed between the inlet and outlet, but rather the flushing is brought about by leakage flows proceeding from the inlet flow and from the outlet flow directly to the exterior.

DE 94 18 880 U1 relates to a filtering system with back-flushing, wherein the filter is mounted on a supporting sieve on the appropriate side of the filter for the purpose of back-flushing.

DE 195 19 907 A1 describes a sieve replacement system, wherein two inlet channels each with one sieve converge and are operated either jointly in a flow direction or wherein an inlet can serve as an outlet for the back-flushing.

EP 0 922 558 A1 describes a device for filtering viscous spinning compounds, such as for example NMMO-cellulose solutions, wherein a sieve carrier body is mounted displaceably in a housing, wherein a gap is provided between said carrier body and its guide, which sieve carrier body is held in a floating position by the pressure of the filtered spinning compound without the need for spacers.

A comparable device is also shown in WO 02/16113 A2, wherein two carrier bodies each with two sieve arrangements are provided in the corresponding housing, so that the effective sieve area is reduced by only 25% during the regeneration of just one of the total of four sieve arrangements.

EP 0 781 356 B1 shows a method for transporting a cellulose solution in an aqueous tertiary amine oxide, wherein reliable transport of the solution is achieved by providing an opening at points with low flow rates, from which opening a part of the solution exits without being united again with the main flow. A leakage is consciously accepted in order to improve the flow.

EP 0 915 729 B1 relates to a filtering device with spacers, which are avoided in the aforementioned EP 0 922 558 A1. These two patent specifications have in common the knowledge that many spinning solutions, such as NMMO-cellulose solutions, lead to deposits in the guides of sliding or rotation elements, which form corrosive or other side-products which are detrimental to the product quality. Instead of avoiding dead spaces, gaps are intentionally formed, which are intended to be flushed regularly. A drawback with this device is the occurrence of leakages, i.e. the loss of spinning solution: the fluid flow that passes into the gap is discharged to the exterior.

SUMMARY

An aim of the present invention is to make a filtering system available, which is suitable for unstable fluids and which avoids dead space deposits, so that no corrosive decomposition products arise and, in addition, intentionally provided leakages are avoided.

According to the invention, it turned out that, in order to avoid the formation of corrosive deposits in a gap, it is desirable to achieve a gap width as constant as possible and therefore an essentially uniform flow resistance and a uniformly distributed flow rate in the entire gap region. According to the invention, this problem is solved by the subject-matters of the claims.

In particular, the invention relates to a method and a device for the purification of a fluid with a filtering device, which filtering device comprises a housing with at least one inlet and at least one outlet and a sliding means or a slide slidably received in the housing and having at least one through-flow channel with at least two filters arranged essentially symmetrically opposite one another, wherein the fluid proceeding from the inlet of the housing flows symmetrically against the filters in the through-flow channel and is conveyed after the filters in the through-flow channel to the outlet of the housing, wherein a part of the fluid that does not flow through the through-flow channel penetrates into a gap between the sliding means and the housing or flows through the gap, and thereby forms a hydrodynamic buffer. Accordingly, the filtering device is preferably configured for achieving a symmetrical inflow and outflow situation, which contributes towards the creation of the hydrodynamic buffer. The invention also relates to a filtering device, in particular for performing the method according to the invention, with a housing which comprises at least one inlet and at least one outlet, and with a sliding means or slide which is slidably received in the housing and which comprises at least one through-flow channel with at least two filters arranged symmetrically opposite one another, wherein a gap for the passage of a part of the fluid is provided between the housing and the sliding means. More detailed descriptions of the special and preferred aspects according to the invention likewise relate to the method (in which the device is used) and the device (which can be used for the method according to the invention).

In the course of the present invention, it has been found that previous filtering arrangements have a tendency towards deposits on the slide. It is also known that gaps between the moving parts can be provided for this problem in itself, as described for example in EP 0 922 558 A1. As a result of the asymmetrical application of force on the sieve carrier body, caused by the one-sided formation of the downstream channel, the slide is pressed onto the housing guide surface opposite the downstream side. In a similar way, the same applies to the device shown in WO 02/16113 A2, i.e. a symmetrical flow upstream and/or downstream of the carrier body is not shown therein and, on account of the asymmetrical arrangement of the inlet and outlet channels in the housing, there is no force equilibrium such as can be achieved with the filtering device according to the invention. An annular gap with an approximately constant width over the entire circumference of the slide cannot therefore be formed with either of the two devices. In the region of the slide surface lying opposite the downstream side, the risk of encrustation and deposits continues to exist in each case on account of the non-existent or barely existent flow.

According to the invention, this problem has been solved by the through-flow channel in the slide flowing into at least two symmetrically opposing sub-channels of the outlet in the housing, wherein at least four flushing flows are produced in the gap between at least two inlet mouths and at least two outlet mouths of the through-flow channel with the method according to the invention. Since two or more inlet sub-channels, preferably distributed uniformly over the circumference, and in addition two or more outlet sub-channels, preferably distributed uniformly over the circumference, are disposed in the housing, said sub-channels being disposed in each case opposite the corresponding inlet and outlet mouths of the slide in the through-flow position of the slide, a symmetrical application of force on the slide and therefore a hydrodynamic centering of the slide is achieved. The flow pressure proceeding from the inlet sub-channels acts equally from both sides in the most favourable case, so that a force equilibrium is established which minimises friction of the slide against an inner wall of the housing and promotes a completely floating bearing. As a result of this measure, a uniform gap formation over the circumference of the slide is produced in each operating state of the filter and dead zones with a very low or disappearing flow rate are prevented, so that deposits and encrustation can be effectively prevented on the entire surface.

The symmetry or the characterisation of elements or parts as "symmetrically opposing", in its meaning intended here, signifies in this connection that the arrangement of the elements in respect of at least one axis of symmetry is mirror-symmetrical or rotation-symmetrical; in general, multiple symmetries or arrangements with one or more symmetrical axes are also implied therewith. In particular, the symmetry relates to an axis of symmetry along the length of the sliding means. Ultimately, the force equilibrium achieved by the arrangement of the filters and the sub-channels is the decisive factor. According to the invention, the latter can be achieved with two, three, four or more filters and sub-channels, wherein the number of the inlet sub-channels, the outlet sub-channels and the filters is usually equal. The person skilled in the art can also immediately see from the aforesaid that a force equilibrium with apparently asymmetrical arrangements can also be produced by a suitable selection of the filter and sub-channel cross-sections. All such arrangements achieve, with equivalent means, the same effect as the preferred embodiment of the device according to the invention expressly described here.

A feature of the previously known embodiments is the discharge of the leakage flow from the gap between the housing and the slide to the exterior, i.e. via an outer end of the gap that is defined by the end of the slide or the end of the housing, and not via a drain or outlet. The leakage flow is not united again with a main flow of the fluid, but is lost (at least temporarily) for the further production steps. This necessarily takes place in the longitudinal or displacement direction of the slide, wherein non-uniform flow rates necessarily result over the circumference of the slide, since the leakage flow preferentially flows from the inlet and outlet channels directly in the longitudinal direction of the slide. In the regions between the channels (viewed in the circumferential direction), zones are formed which are either not flushed or only flushed insufficiently and at which deposits and encrustation therefore arises.

In order to overcome this drawback, it is possible according to the invention, in addition to the symmetrical application of force on the slide and the essentially constant gap width thus advantageously arising over the entire circumference of the slide, to prevent a leakage flow to the exterior by the gap between the housing and the slide not extending over the entire length of the slide or the housing. Instead, the method can be improved in such a way that all the flushing flows are conveyed to an outlet of the housing, for example by the gap being limited in the displacement direction of the slide outwards by sealing elements. The ends of the housing at which the slide projects out of the housing can preferably be constituted as fluid-tight as possible. A purely mechanically produced seal at the ends of the housing can be achieved with a metallic seal, a soft material seal or a stuffing box seal, or other measures known per se for preventing leakage can be taken. Accordingly, in the filtering device according to the invention, preferably metallic sealing elements can be provided between the sliding means and the housing, said sealing elements limiting the otherwise continuous gap in the sliding direction outwards. For example, the sealing elements can be provided on both sides of the through-flow channel in two or more planes parallel to the central plane of the through-flow channel, i.e. to the plane for which the sum of the spacings of all the mouths of the through-flow channels is at a minimum or—if the centre points of the mouths lie in a plane—the plane running through the mouth centre points. If the slide comprises a plurality of through-flow channels, sealing elements between the through-flow channels can possibly be dispensed with. The two or more planes in which the sealing elements are disposed are preferably offset with respect to one another in the sliding direction.

With regard to the flushing flows in the gap outside the slide, it has been found to be particularly advantageous if their flow rate is essentially equal to the flow rate against the filters in the through-flow channel and/or in the range from 0.02 to 0.60 cm/s, preferably between 0.10 and 0.40 cm/s. On the basis of the design of the gap, it follows that, since the pressure increases upstream of the filter at high throughput rates due to the higher pressure loss via the filter, the drop in pressure in the hydraulic buffer is also higher and a greater quantity flows through.

It has been found to be particularly advantageous if the gap width is selected such that the quotient of the volume (in $mm^3$) of the gap and the sum of the filter areas (in $mm^2$) of the sliding means has a value between 0.5 mm and 3 mm. With preset filter and slide dimensions, this value—also referred to as the "polymer buffer factor"—defines the range of gap widths which achieves a particularly favourable compromise between a sufficient flow rate (for the avoidance of deposits) and yet a sufficient purification of the fluid (i.e. a small quantity of fluid passing through the gap unfiltered).

Moreover, according to the invention it is advantageous to select the gap width such that the specific flushing cross-section has a value between 0.2% and 1.5%, wherein the specific flushing cross-section is defined as the product of the number of (independent) flushing flows with the quotient of the gap cross-section (in $mm^2$), i.e. the gap width multiplied by the length of the gap normal to the flow direction of the flushing flows or in the displacement direction, divided by the sum of the filter areas of the sliding means (in $mm^2$).

In order to achieve a hydrodynamic bearing with advantageous stability and at the same time sufficient flow rate, the ratio of the length to height of the fluid film in the gap can preferably be selected such that the quotient of the length of the gap normal to the flow direction of the flushing flows or in the displacement direction added to twice the length of the oscillation range divided by the diameter of the sliding means lies in the range between 0.6 and 3.

In order to obtain flushing flows as uniform as possible, the sliding means can be displaced, for variation of the flushing flow distribution, essentially normal to the flow direction of the flushing flows or in the sliding direction. As already discussed, in the case of devices of the type mentioned at the outset, fluid deposits primarily occur on the surfaces of the housing or the sliding means that come into direct contact with the fluid, and solidifying decomposition products arise. According to the invention, this problem is solved by a method for the cleaning of a device of the type discussed above, wherein the sliding means or the slide is displaced essentially normal to the through-flow channel for the purpose of cleaning. A displacement has the advantage that the fluid present in the gap between the slide and the housing is caused to move by the relative movement of the gap walls, so that a flushing fluid flow is produced in the gap under the effect of the flow pressure.

In general, it has turned out to be advantageous if the slide or the slide means is cylindrical. In this case, the gap provided between the housing and the slide does not have any corners or edges which would hinder the fluid flow and promote the deposition of fluid deposits. Moreover, the cylindrical shape is suitable especially for a bearing (hydrodynamic bearing) of the slide that is floating uniformly under pressure on the fluid, since the fluid flow in the gap thus always runs tangential to the surface of the slide and there are therefore no areas of application for forces acting transverse to the displacement axis of the slide. Apart from this, a cylindrical sliding means can, for the variation of the flushing flow distribution, be rotated particularly easily with respect to the housing in addition to or as an alternative to a displacement. Very generally, a variation of the flushing flow distribution can be achieved with a rotation independently of the shape of the slide, wherein rotations through 1°-30°, particularly preferably through 5°-15°, can preferably be carried out.

In order to avoid dead spaces, it is moreover advantageous if, in the case of such a method, the displacement and/or the rotation of the sliding means is less than the height or width of the mouths of the through-flow, inlet and outlet channels, so that the fluid flow in the through-flow channel is not interrupted by the displacement or rotation. Despite the relatively small displacement and/or rotation, the cleaning effect can be improved by the displacement and/or rotation being carried out periodically in both directions proceeding from a through-flow position along or around the displacement axis, so that the sliding means swings or oscillates in the housing.

The fluid deposits can be very efficiently carried away and removed by an oscillating motion of the sliding means, in particular by the fluid flows at the edges of the mouths due to local pressure differences. With a corresponding cleaning process, the described oscillating motion can preferably be carried out at least twice, four times, ten times or 20 times in both directions. In addition, the flushing flow is made more uniform by constant oscillating stroke and/or rotation movements of the slide.

In order to enable back-flushing of the filters essentially without interrupting the fluid flow, the sliding means can comprise at least two through-flow channels offset with respect to one another in the sliding direction and disposed essentially normal to a displacement axis of the slide, wherein the sliding means is displaced just far enough during the back-flushing for one of the through-flow channels to be completely displaced with respect to the inlet and therefore closed, but still communicating with the outlet. "Communication", as used here, permits a direct flow of the flow between the openings concerned, e.g. the inlet, through-flow and outlet channels, without taking account of a fluid flow via the gap.

In order that back-flushing of a filter inserted in the slide can be carried out without significant leakage, a back-flushing channel can be provided, in the housing, said back-flushing channel communicating with one of the two through-flow channels when the slide is displaced into the back-flushing position. In particular, the through-flow channel completely displaced with respect to the inlet and therefore closed can preferably communicate at the inlet side with a back-flushing channel in the housing, wherein the filters disposed in this through-flow channel are back-flushed by an inverted flow of the fluid, i.e. directed against the operating direction, from the outlet to the back-flushing channel. During back-flushing, therefore, the fluid passes, against the operating through-flow direction, out of the through-flow channel through the filter into the back-flushing channel. If, in the back-flushing position, the through-flow channel communicating with the back-flushing channel communicates at the other end with an outlet sub-channel, the outlet sub-channel preferably also communicating with another through-flow channel which in turn communicates with the inlet, the fluid flow can advantageously be maintained by the through-flow channel communicating with the inlet. Since the back-flushing channel communicates with a mouth of the through-flow channel disposed on the inlet side, the back-flushing channel essentially lies, in the most favourable case, in a plane with the inlet sub-channels.

If, for example, satisfactory cleaning of a filter cannot be achieved by means of back-flushing, it is advantageous if the sliding means is displaced into a filter replacement position, wherein a filter mount of a through-flow channel is disposed completely outside the housing, said filter mount being formed for example by a mouth of a through-flow channel to the inlet, so that a filter mounted in the filter mount can be removed and replaced. In this connection, the fluid flow can—with a suitable configuration of the sliding means according to one of the possibilities described above—be continued through the through-flow channel remaining in the housing and the filter thereof. In this way, the sliding means can also be fully cleaned, wherein one half (the lower one) of the slide is cleaned when one filter (e.g. the lower one) is changed and the other half (the upper one) of the slide is cleaned when the other filter (e.g. the upper one) is changed.

The filters disposed in the slide or sliding means are preferably inserted into a mount. If the mount is constituted on the inlet side in such a way that the movement of the filter is limited, i.e. that the filter can be introduced only up to a certain position, for example because the mount behind said position tapers with respect to the filter dimensions, the filter is held in the mount by the flow pressure. The filter can be any separating device that is suitable for separating particulate impurities from the fluid, in particular a sieve.

According to the invention, each through-flow channel of the sliding means leads into its own sub-channel of the outlet (and also of the inlet). Nonetheless, a configuration could be found that permits a desired fluid flow during operation, during a back-flushing position and during a sieve or filter replacement.

In order to maintain the desired fluid flow in a back-flushing position, the distance between the mouths of the two through-flow channels from the outlet is preferably smaller than the height of at least one, preferably of the first and second, sub-channel of the outlet. As a result of the smaller distance between the mouths compared to the height of a sub-channel, the two mouths of the through-flow channels can communicate in the back-flushing position, i.e. fluid exiting from the mouth disposed essentially centrally between the sub-channels can enter through the sub-channel closer to the second mouth into the second month displaced outwards and can thus perform back-flushing of the filter disposed there against the through-flow direction. In this connection, it is particularly advantageous if the distance between the mouths of the two sub-channels of the outlet is smaller than the height of the mouth of at least one through-flow channel, preferably two through-flow channels, to the outlet, because in this case the fluid exiting from the mouth disposed centrally can at the same time exit into the sub-channel of the outlet that is farther away from the second mouth, so that the fluid flow does not stagnate in this sub-channel either.

Suitable matching of the mouth height and the mouth spacings, with at the same time the retention of an otherwise essentially identical line or channel diameter of the sub-channels and through-flow channels, can be achieved in a straightforward manner by at least one mouth of a sub-channel of the outlet to the sliding means comprising a widened portion either on the housing side or on the sliding means side.

If the distance between the mouths of the two sub-channels of the inlet is smaller than the height of the mouth of at least one, preferably the first and the second, through-flow channel to the inlet, a fluid flow can be maintained in both sub-channels of the inlet also in a displaced back-flushing position, in which the mouth of one of the through-flow channels is completely displaced with respect to the sub-channels of the inlet, so that no fluid can enter in the through-flow or filtering direction into the respective through-flow channel. With this configuration, the fluid can pass from the two sub-channels of the inlet through the remaining through-flow channel open in the filtering direction. The closure of the displaced through-flow channel with a maintained fluid flow in the two sub-channels of the inlet can be achieved particularly when the sum of the distance between the mouths of the two sub-channels of the inlet and the height of the mouth of the sub-channel disposed on the displaced through-flow channel side is smaller than the sum of the distance between the mouths of the through-flow channels to the inlet and the height of the mouth of the open through-flow channel.

In a comparable manner to the matching on the outlet side, it is also advantageous here for a suitable configuration of the mouth heights and spacings, with the retention of an otherwise essentially identical diameter of the sub-channels and through-flow channels, if the mouths of the sub-channels of the inlet to the sliding means comprise a widened portion either on the housing side or on the sliding means side.

Independently of the problem described above, it is a problem of the invention to permit a fluid flow during operation, during a back-flushing position and during a sieve or filter replacement and at the same time to avoid unacceptable fluid leakage or an unacceptable fluid loss. This problem is solved in combination with the described inventive features of the method and/or devices, but also independently of the latter by a filtering device for the purification of a fluid, with a housing which comprises at least one inlet and at least one outlet, and with a slide slidably received in the housing, which comprises at least a first and a second through-flow channel each with a mount for an insertable filter, wherein, in a through-flow position of the slide, the housing inlet flows via at least a first and a second sub-channel into the first and respectively second through-flow channel of the slide, wherein the first and second through-flow channel flow in each case into a first and a second sub-channel of the outlet, and wherein a gap is provided between the housing and the slide in the region between the sub-channels of the inlet and of the outlet.

In an arbitrary embodiment of the invention, the housing and/or the sliding means is preferably made of a metal or a metal alloy, which is preferably ferrous. Metal alloys or metal ions dissolved therefrom can serve as a catalyst for chemical reactions, including for explosive reactions. When use is made of metals, therefore, the inventive avoidance of dead spaces and deposits in the shut-off element is particularly advantageous for preventing such reactions. The housing and/or the sliding means can be produced from various materials, such as steel, special steel, ceramic, sintering metals, aluminium, plastic, nonferrous metals or precious metals. Preferred materials are all irons, iron alloys, chromium-nickel steels, nickel steels (e.g. Hastelloy materials), titanium, tantalum, silicon carbide, glass, ceramic, gold, platinum and also plastics. Special materials are alloys with a high molybdenum content or nickel, chromium and molybdenum alloys for resistance against pitting and crevice corrosion or nickel-copper alloys with a high tensile strength. Material examples are Hastelloy C (high corrosion resistance), Hastelloy B (precipitation-hardening high-temperature alloy), Inconel (resistance to stress corrosion cracks in petrochemical applications), Incoloy (high strength as well as resistance to high temperatures and in respect of oxidation and carburisation), Monel (high tensile strength, resistant to corrosion). The housing and/or the sliding means can however also be produced from coated materials.

Fluids with which the use of the filtering device according to the invention can be particularly effectively employed are chemically unstable fluids, which when deposited in the filtering device are corrosive or potentially explosive.

In particularly preferred embodiments, the fluid is a moulding compound, preferably a spinning compound. For example, the fluid can be a cellulose solution, preferably a solution of cellulose with an amine oxide, particularly preferably with NMMO (N-methylmorpholin-N-oxide).

The chemically unstable fluid is preferably thermally unstable. Thermally unstable fluids are for example cellulose solutions, such as cellulose-amine oxide solutions, especially solutions of tertiary amine oxide and water. Such solutions can contain, apart from stabilisers, such as for example gallic acid propylester, organic or inorganic bases, such as for example soda lye. Furthermore, such cellulose/amine oxide and water solutions can also contain product-changing additives, so-called incorporation agents. Cellulose solutions, produced in the amine oxide system, are characterised in that they crystallise when cooled, but can be melted at a temperature of approx. 72-75° C. An example is a cellulose-NMMO solution as described in EP 789 822. The fluid can be an aqueous amine oxide solution with differing concentrations. Thermally unstable fluids are those with which there is a risk of an increase in temperature during the transport through the connecting piece or the heat exchanger line. Temperature increases can occur for example due to exothermic reactions, in particular chemical reactions, or due to the heat of friction during the transport of highly viscous fluids. Further fluids are in particular solidifiable fluids, in particular "hot melts", such as polymers, polycarbonates, polyesters, polyamides, polylactic acid, polypropylene, etc. The fluid can be a thixotropic fluid, in particular a spinning solution. Special fluids have a melting temperature of at least approx. 40° C., at least 50° C., at least 55° C., at least 60° C., at least 65° C., at least 70° C., at least 75° C. The fluid can be conveyed at exemplary temperatures of at least approx. 40° C., at least 50° C., at least 55° C., at least 60° C., at least 65° C., at least 70° C., at least 75° C., at least approx. 80° C., at least 85° C., at least 90° C., at least 95° C. The connecting piece is designed for the transport of these fluids above the melting temperatures—e.g. according to selected temperature-regulating means. The zero shear viscosity of the fluid is preferably in the range from 100 to 20,000 Pas, in particular between 500 and 15,000 Pas.

BRIEF DESCRIPTION OF THE DRAWINGS

The present invention is explained further by the following figures and examples, without being limited to these exemplary embodiments of the invention.

FIGS. 3a and 3b show representations comparable with FIGS. 2b and 2c, with the difference that sealing elements are provided here between the slide and the housing.

FIGS. 4a and 4b show representations with a cross-section through the housing and the slide positioned therein along a displacement axis of the slide, wherein the slide is disposed in the through-flow position.

FIGS. 5a and 5b show representations according to FIGS. 4a and 4b in an intermediate position during oscillation of the slide and FIG. 5c shows a detail from FIG. 5b.

FIG. 6a and FIG. 6b show representations according to FIGS. 4a and 4b in a back-flushing position and FIG. 6c shows a detail from FIG. 6b.

FIG. 7a and FIG. 7b show representations according to FIGS. 4a and 4b in a sieve replacement position and FIG. 7c shows a detail from FIG. 7b.

DETAILED DESCRIPTION

Figure 1:
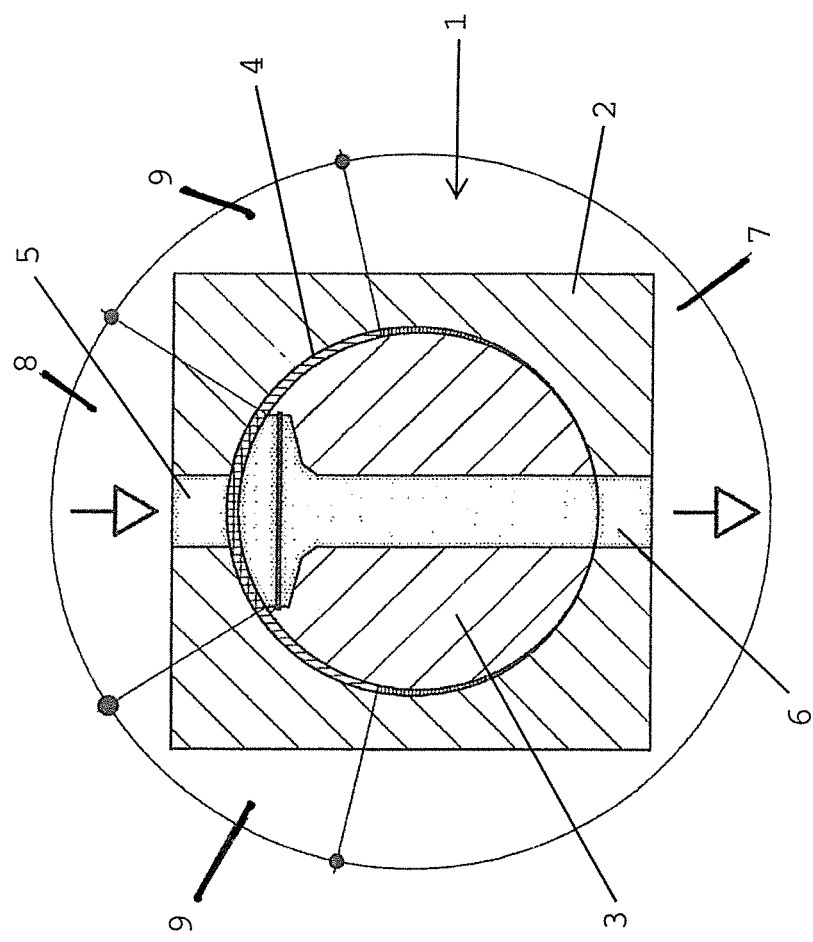
FIG. 1 shows a cross-section through a filtering device known in the prior art with an asymmetrical feed.

FIG. 1 shows a cross-section through a filtering device 1 with a housing 2 and a slide 3, such as is already known in the prior art. Provided between slide 3 and housing 2 is a gap 4, which extends essentially parallel to a longitudinal axis of slide 3, i.e. normal to the plane of the representation, up to an upper and lower edge of housing 2. A flushing flow arises in gap 4 on account of the pressure difference between an inlet 5 of housing 2 and the surroundings. However, the width of gap 4 diminishes from inlet 5 towards mutually opposite outlet 6 on account of the one-sided pressure on slide 3. On account of the viscosity of the fluid, the same applies to the flow rate, so that, on the side of slide 3 facing outlet 6, a zone 7 with a stagnating flushing flow, a so-called "dead zone", arises, in which deposits of the fluid can easily occur. The greatest flow rate, on the other hand, is to be observed in zone 8 above and below (vertically with respect to the plane of the representation) inlet 5. Between this zone 8 and dead zone 7, a zone 9 with a reduced flushing flow lies on both sides of inlet 5.

Figure 2A:
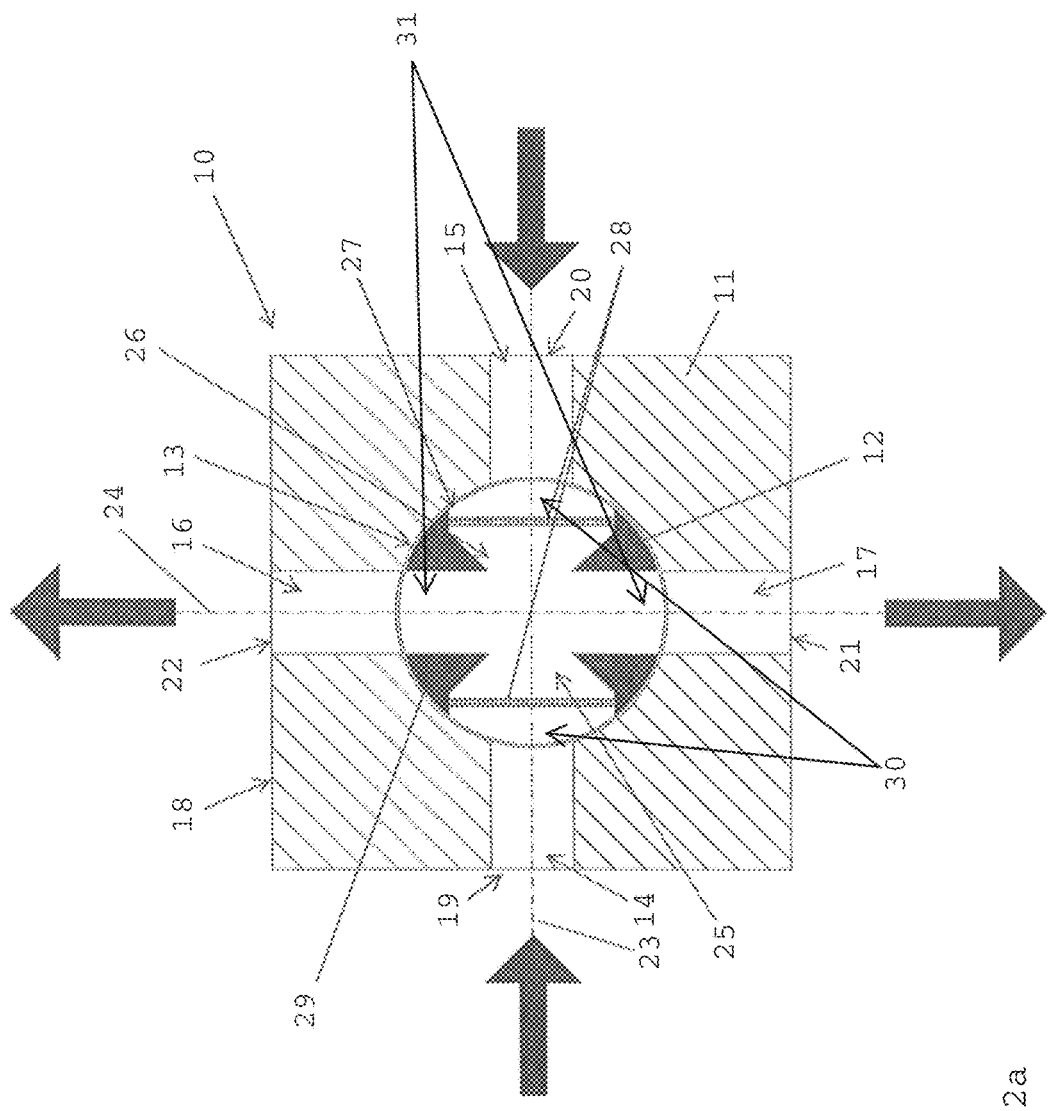
FIG. 2a shows a cross-section through the housing of a filtering device according to the invention with an internal slide, a cross-section through a through-flow channel being shown.

FIG. 2a shows a cross-section through an inventive filtering and back-flushing device 10 for fluids with a housing 11 and a slide 12. Housing 11 comprises a recess 13 with a circular cross-section for receiving the slide 12. From recess 13, four channels 14, 15, 16, 17 lead to outer side 18 of housing 11, two of which are provided as inlet channels 14, 15 and two as outlet channels 16, 17. Inlet channels 14, 15 connect two inlets 19, 20 of housing 11 to the slide receiving arrangement 13 and outlet channels 16, 17 correspondingly connect the slide receiving arrangement 13 to two outlets 21, 22 of housing 11. The two inlet and outlet channels 14, 15, 16, 17 each lie opposite one another on an axis 23, 24, wherein axis 24 of outlet channels 16, 17 is disposed essentially normal to axis 23 of inlet channels 14, 15. The width of the four channels 14, 15, 16, 17 is essentially equal to or less than the radius of recess 13. The shown through-flow channel 25 in slide 12 connects the four channels 14, 15, 16, 17 of housing 11 in the manner of a cross. The width of through-flow channel 25 in slide 12 in the direction of outlet channels 16, 17 is essentially equal to the width of outlet channels 16, 17. In the direction of inlet channels 14, 15, through-flow channel 25 is widened in the shape of a truncated cone over a part 26 of the section, before it transforms on both sides into tubular filter mounts 27, which are wider or have a larger diameter than inlet channels 14, 15 lying opposite them in housing 11. A sieve 28 is disposed in filter mounts 27, in each case normal to flow axis or channel axis 23, said sieve extending up to the wall of filter mount 27. On account of tapering 26 of through-flow channel 25 from filter mount 27 in the through-flow direction, sieves 28 are held in slide 12 by the flow pressure. Sieves 28 are orientated according to the through-flow or flow direction, i.e. disposed corresponding to the intended sieve configuration (side facing the flow, side facing away from the flow) in filter mount 27. The slide 12 is essentially cylindrical, wherein the outer radius of slide 12 is smaller than the inner radius of recess 13 in housing 11, so that a gap 29 is formed between housing 11 and slide 12. Gap 29 surrounds slide 12 on all sides and thus also connects the four channels 14, 15, 16, 17 of housing 11 to one another. The gap diameter or the width of gap 29 is calculated, amongst other things, from the total area of all sieves 28 of slide 12, the diameter of slide 12, the diameter of a sieve 28 and—in the case of a plurality of through-flow channels 25—the distance between the through-flow channels (see table at the end of the description). On account of symmetrically disposed inlet mouths 30 and outlet mouths 31 of slide 12, the fluid pressure produces a force equilibrium which brings about a hydrodynamic centering of slide 12 in recess 13 of the housing. Accordingly, the diameter of gap 29 is essentially identical over the entire circumference of slide 12 and no narrow points and dead zones result—in contrast with the arrangement shown in FIG. 1.

Nonetheless, the flow rate of the fluid flowing through gap 29 and forming a flushing flow is not constant in the entire volume of gap 29. Since the pressure difference between inlet channels 14, 15 and the surroundings (see FIG. 2c) and between outlet channels 16, 17 and the surroundings 32 is greater than between inlet channels 14, 15 and outlet channels 16, 17, flow direction 33 in these regions 34 (see FIG. 2b) runs parallel to longitudinal axis 35 of slide 12, i.e. the flushing flow runs both from inlet channels 14, 15 and from outlet channels 16, 17 to the exterior. In regions 36 between the latter, the flow rate is therefore reduced.

FIGS. 3a and 3b show respectively a transverse and longitudinal section through a filtering device according to the invention with a housing 37 and a slide 39 disposed in a recess 38 of housing 37. Housing 37 comprises mutually opposite inlet channels 40 and also mutually opposite outlet channels 41. In the through-flow position of slide 39, inlet mouths 42 and outlet mouths 43 of slide 39 are disposed in each case opposite the aforesaid channels, wherein inlet mouths 42 form mounts for filter elements 44. Inlet mouths 42 and outlet mouths 43 are part of a through-flow channel 45 in the slide and are connected to one another via through-flow channel 45. The fluid to be purified flows under pressure through inlet channels 40 onto inlet mouths 42 and filter elements 44 disposed therein. It is conveyed through filter elements 44 at a specific upstream flow rate and then flows along through-flow channel 45 to the two outlet mouths 43 and from there onward through outlet channels 41.

A gap 46 is constituted between slide 39 and the wall of receiving arrangement 38 of housing 37. In contrast with the preceding examples of embodiment, gap 46 is limited by sealing elements 47 (see FIG. 3b). Sealing elements 47 surround slide 39 and form a tight closure between slide 39 and housing 37. Sealing elements 47 are each disposed in a plane parallel to through-flow channels 45 and normal to a longitudinal axis 48 of the slide. In principle, however, arbitrarily arrangements can be selected, which simultaneously provide a seal of gap 46 between inlet channels 40 and surroundings 49 and between outlet channels 41 and surroundings 49, but not between inlet channels 40 and outlet channels 41. Depending on the desired course of the flow, a sealing element 50 can also be disposed between through-flow channels 45 in the case of a plurality of through-flow channels 45, said sealing element separating the flushing flows of the two through-flow channels 45. This is advantageous particularly when the flushing flows flow in opposite directions, for example in a back-flushing position, or when different flow rates are to be expected in the gap sections assigned respectively to a through-flow channel 45.

The width of gap 46 is selected such that a part of the fluid, instead of flowing along through-flow channel 45 through slide 39, flows on the outside past slide 39 from inlet channels 40 directly to outlet channels 41, wherein the flow rate of these flushing flows roughly corresponds to the flow rate upstream of and against filter elements 44. A flow to surroundings 49 with the associated loss of fluid is prevented by sealing elements 47. Four flushing flows thus arise in the region of through-flow channel 45, the course and direction of said flushing flows being indicated by arrows 51 in FIG. 3a. The flushing flows thus form a polymer buffer on which slide 39 is received in a centred manner. Outlet mouths 43 of through-flow channels 45 can be connected to one another or can communicate with one another via a mouth channel 52 in recess 38 of housing 37. The diameter of a filter element 44 is denoted by $D_{sieve}$ and the distance between through-flow channels 45 and the centre points of filter elements 44 is denoted by $L_{sieve}$; $D_{piston}$ denotes the diameter of slide 39 (see table at the end of the description for examples).

FIGS. 4a and 4b show a further variant of the device according to the invention, in each case by means of a cross-section through a housing 53 and slide 54 received therein in a through-flow position along longitudinal and displacement axis 55 of slide 56, wherein FIG. 4a shows a cross-section in the plane of outlet channels 57, 58 and FIG. 4b shows a cross-section in the plane of inlet channels 59, 60. As can be seen in FIG. 4a, slide 54 comprises two through-flow channels 61, 62, which are disposed offset in slide 54 along displacement axis 55. The total of four outlet sub-channels 57, 58 (abbreviated below to outlet channels) assigned to the two through-flow channels are disposed essentially in parallel. Housing 53 accordingly comprises four outlets 63, 64. Outlet channels 57, 58 comprise a widened portion 66 towards a slide receiving arrangement 65 provided in housing 53, which widened portion. 66 is widened in the displacement direction, i.e. in the direction of displacement axis 55. The mouths of outlet channels 57, 58 at the inside of housing 53 are accordingly essentially oval or elliptical, wherein the principal axis is parallel to displacement axis 55. Alternatively, the mouths can also be circular, wherein the widened portions of outlet channels 57, 58 are in the shape of a truncated cone. In the through-flow position of slide 54 represented in FIGS. 4a and 4b, outlet channels 57, 58 are disposed centred with respect to through-flow channels 61, 62. The distance between the outlet-side mouth centre-points of slide 54 and of housing 53 is identical. The outlet-side mouths of through-flow channels 61, 62 are smaller than the widened mouths of outlet channels 57, 58. The higher inlet-side mouths of through-flow channels 61, 62 are also indicated on slide 54. Due to the widened mouths of outlet channels 57, 58, the distance between these mouths is smaller than that between the outlet mouths of slide 54.

FIG. 4b shows a cross-section as in FIG. 4a, but in a cross-sectional plane which is rotated through 90° around displacement axis 55 and which intersects housing 53 in the plane of inlet channels 59, 60. The two through-flow channels 61, 62 are each obviously connected to the same two inlets 67. In order that inlet channels 59, 60 proceeding from the two inlets 67 flow into four inlet mouths on slide 54, the channels must be split up and inlet sub-channels 59, 60 (abbreviated below to inlet channels) must each be inclined in different directions with respect to the axis connecting inlets 67. Unlike outlet channels 57, 58, inlet channels 59, 60 in housing 53 have no widened portions. The inlet mouths of through-flow channels 61, 62 in slide 54 are roughly twice as high as inlet channels 59, 60. The distance between the mouths of inlet channels 59, 60 is essentially equal to the distance between the inlet mouths of through-flow channels 61, 62. The centre points of the mouths of inlet channels 59, 60 are therefore disposed closer together than the centre points of the inlet mouths of through-flow channels 61, 62.

Figure 2B:
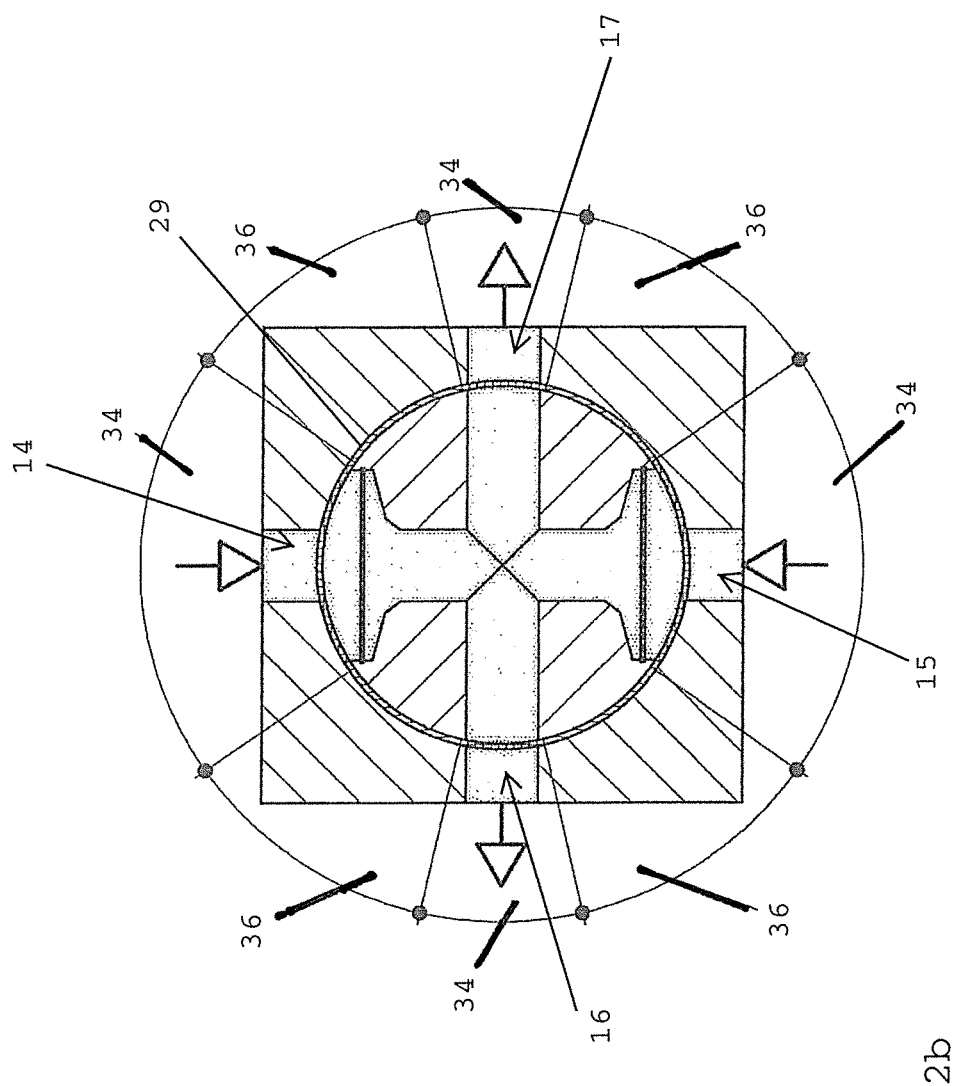
FIGS. 2b and 2c show a cross-section according to FIG. 2a, i.e. along a displacement axis of the slide, wherein no sealing elements are provided between the slide and the housing and the sectors thus arising with different flushing flow rates are shown.
Figure 2C:
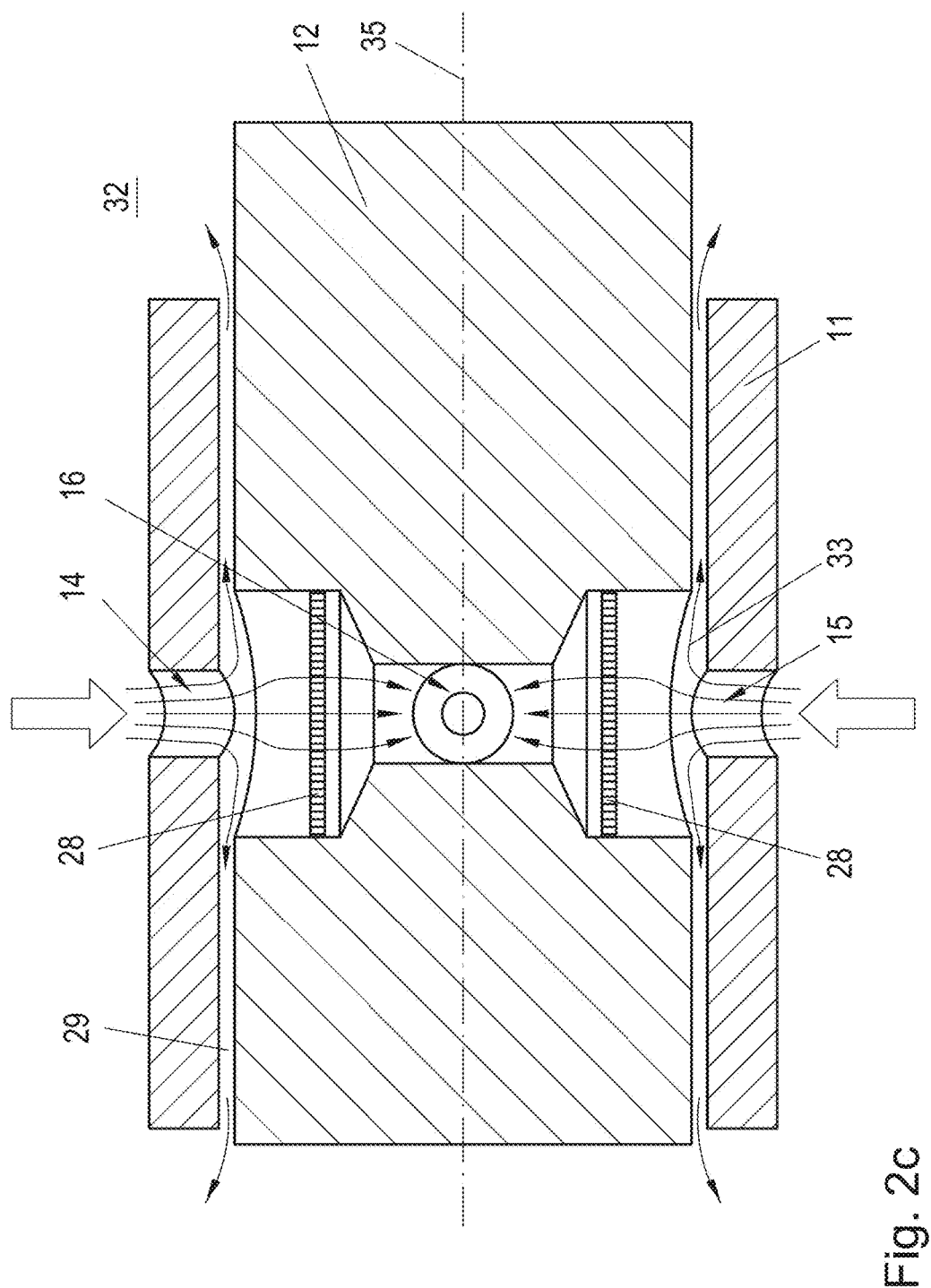

Since through-flow channels 61, 62 in slide 54 lie in a plane normal to displacement axis 55, the distance between the mouth centre-points of inlet channels 59 and 60 is smaller than in the case of outlet channels 57, 58 on the inside of the housing, i.e. in slide receiving arrangement 65. The distance between said mouths is however roughly the same. In the through-flow position shown in FIGS. 4a and 4b, the arrangement comprising housing 53 and slide 54 shows essentially reflection symmetry with respect to a plane of symmetry disposed centrally between the two through-flow channels 61, 62 and normal to displacement axis 55, so that essentially the same quantity of fluid enters into all the sub-channels 59, 60 of inlets 67 during the splitting-up and the same quantity of filtered fluid also exits from all the outlet channels 57, 58. Provided between housing 53 and slide 54 is a gap 68, which is bounded at upper side 69 and underside 70 of housing 53 by sealing rings 71 at the edges of recess 65. In FIG. 2b, moreover, back-flushing channels 72 are provided between sealing rings 71, said back-flushing channels being explained in greater detail below in connection with FIG. 6c.

FIGS. 5a and 5b show device 73 according to FIGS. 4a and 4b in the same perspectives, but with a changed slide position. Slide 54 is displaced here slightly, i.e. less than the width of an inlet channel 59, 60, in the direction of underside 70 of housing 53. Since the outlet-side mouths between housing 53 and slide 54 are centred in the through-flow position, all the outlet-side mouths have the same cross-section remaining open in the displaced position. In contrast with this, the inlet mouths of lower through-flow channel 62 in FIG. 5b are displaced with respect to inlet channels 59, 60 in such a way that the mouths of lower inlet channel 60 are roughly half-closed. In contrast, upper inlet channels 59 are completely opened on account of the higher inlet mouths of upper through-flow channel 61. Slide 54 can advantageously oscillate or move in a pendulum fashion or swing between the position shown here displaced downwards and a position displaced correspondingly upwards in the opposite displacement direction out of the through-flow position (see FIGS. 4a and 4b). Pressure differences are produced in gap 68 between housing 53 and slide 54, which prevent or at least counteract deposits and solidification of the fluid in gap 68. As a result of the changes in the openings of lower inlet channels 60, flow differences between the two through-flow channels 61, 62 are also produced, which enable improved flushing in through-flow channel 61 and 62 through which the flow is faster in each respective case. Moreover, the surfaces on slide 54 and in housing 53 adjacent to the mouths are temporarily exposed by the displacements and the main flow of the fluid thus flushes around the latter. FIG. 5c shows a detail view of lower through-flow channel 62 according to FIG. 5b. Gap 68 between slide 54 and housing 53 can be seen here. An inner surface 74 of housing 53 adjacent to the inlet mouth is exposed in filter mount 75 forming the inlet mouth of slide 54, so that any deposits can be flushed away. Moreover, a surface 76 of slide 54 between through-flow channels 61, 62 is exposed to the fluid flow and is therefore also flushed. The two sealing rings 71 and the lower edge of slide receiving arrangement 65 bound gap 68 and prevent a leakage, i.e. an escape of fluid through gap 68 to underside 70 of housing 53. Provided between sealing rings 71 is a back-flushing channel 72, which however is closed by slide 54 in the position shown here, i.e. during the oscillation.

FIG. 6a, 6b and detail view 6c show housing 53 with slide 54 in a back-flushing position. Slide 54 is displaced in the direction of underside 70 of housing 53 to an extent such that upper through-flow channel 61 is essentially centred between upper outlet channels 57 and lower outlet channels 58. Nonetheless, the two through-flow channels 61, 62 continue to communicate with at least one outlet channel 57, 58 in housing 53. Lower through-flow channel 62 is however closed with respect to inlet channels 60 and instead communicates with back-flushing channel 72. The fluid flow entering through inlets 67 in housing 53 thus flows completely into upper through-flow channel 61. At the outflow side, the fluid flow exits out of the mouth of upper through-flow channel 61 into all four outlet channels 57, 58. A part of the fluid then flows from lower outlet channels 58 into lower through-flow channel 62, but against the operating through-flow direction, and passes at its inlet mouth out of through-flow channel 62 and into back-flushing channel 72. In this position, the filters (not shown here) of lower through-flow channel 62 and inner walls 74 of housing 53 adjacent to back-flushing channel 72 and between inlet and outlet channels 57, 58, 59, 60 are flushed and cleaned. An equivalent back-flushing position, but cleaning a filter of upper through-flow channel 61, is of course also provided on the other side 69 of housing 53, so that all the filters can be flushed without interruption of the fluid flow.

FIGS. 7a and 7b show present device 73 in a filter replacement position. Slide 54 is displaced in housing 53 to an extent such that back-flushing channel 72 is closed by central part 76 of slide 54. Filter mounts 75 of lower through-flow channel 62 are disposed outside housing 53, so that a filter replacement or filter maintenance can be carried out. Upper through-flow channel 61 communicates with lower inlet channels 60 and lower outlet channels 58, so that a fluid flow is maintained between inlets 67 and lower outlets 64 of housing 53. During a filter replacement of lower through-flow channel 62, it is only in upper inlet channels 59 and upper outlet channels 57 that the fluid flow almost stagnates. A filter replacement of upper through-flow channel 61 can be carried out in a filter replacement position reversed with respect to the through-flow position, i.e. displaced upwards instead of downwards.

Since the objective invention is intended to be used, amongst other things, for the filtration of solutions comprising cellulose, amine oxide and water, account also has to be taken of the production-specific properties, such as viscosity, shear behaviour, crystallisation tendency, decomposition products, in the mechanical design of the filter apparatus. Taking account of these product properties, the apparatus according to the invention must also be adapted according to the aforementioned mechanical measures (flow rate, gap width etc.) to measures required for the process and operating modes.

Examples of a corresponding process management are represented in the following table. The relationships between the parameters are explained below:

|  |  |  | Example 1 | Example 2a | Example 2b |
|---|---|---|---|---|---|
| Temperature polymer Compound | $T_p$ | ° C. | 92.00 | 94.00 | 94.00 |

-continued

|  |  |  | Example 1 | Example 2a | Example 2b |
|---|---|---|---|---|---|
| Zero shear viscosity (85° C.) | $\eta_0$ | Pas | 15,243.00 | 12,397.00 | 12,397.00 |
| Cellulose concentration |  |  | 12.50 | 12.50 | 12.50 |
| Density |  | kg/dm³ | 1.20 | 1.20 | 1.20 |
| Mean filtration differential pressure |  | bar | 40.00 | 45.00 | 35.00 |
| Sieve area load | SB | kg/m² * min | 73.68 | 194.06 | 194.06 |
| Flushing flow rate | $v_s$ | cm/s | 0.10 | 0.26 | 0.40 |
| Housing height | $H_g$ | mm | 270.00 | 1,180.00 | 1,180.00 |
| Sieve diameter | $D_{sieve}$ | mm | 120.00 | 300.00 | 300.00 |
| Number of sieves per Piston |  | — | 2.00 | 4.00 | 4.00 |
| Sieve area per piston | $A_{piston}$ | mm² | 22,619.47 | 282,743.34 | 282,743.34 |
| Piston diameter | $D_{piston}$ | mm | 170.00 | 430.00 | 430.00 |
| Sieve centre spacing | $L_{sieve}$ | mm | 0.00 | 380.00 | 380.00 |
| Polymer buffer factor | $PV_{spec.}$ | mm³/mm² | 0.85 | 0.97 | 3.23 |
| Gap width | s | mm | 0.30 | 0.30 | 1.00 |
| Number of flushing flows per piston | $n_s$ |  | 4.00 | 4.00 | 4.00 |
| Flushing cross-section per piston | $SQ_x$ | mm² | 144.00 | 816.00 | 2,720.00 |
| Spec. flushing cross-section | $SQ_{spec.}$ | — | 0.64% | 0.29% | 0.96% |
| Oscillation range | $L_{osc.}$ | mm | 10.00 | 44.00 | 44.00 |
| Rotation | $\alpha_r$ | ° | 0.00 | 0.00 | 0.00 |
| Single/multiple bearing |  | — | single | multiple | multiple |
| Length hydrodynamic Bearing | $L_h$ | mm | 140.00 | 768.00 | 768.00 |
| Hydrodynamic bearing - L/D | $L_h/D_{piston}$ |  | 0.82 | 1.79 | 1.79 |
| Spinning reliability |  |  | 2 | 1 to 2 | 3 |
| Lowest measured onset temperature in flushing flow |  | ° C. | 171.00 | 175.00 | 171.00 |

The values stated in the table were calculated for a device according to FIG. 3a, as can be seen from the number of four flushing flows per piston (the sliding means or the slide will be referred to as such below). Example 1 relates to a compact filtering device with a single through-flow channel, for which reason sieve centre spacing $L_{sieve}$ is entered as 0.0. In contrast, examples 2a and 2b deal with a comparatively larger filtering device with two through-flow channels. The two latter examples differ in the gap width and the parameters dependent thereon. The wider gap in example 2b produces a significant deterioration in the so-called spinning reliability. The spinning reliability is determined subjectively, dependent on spinning faults, such as tears, adhesions, etc. and is a reliable measure of the filtration quality with otherwise comparable conditions.

In the selection of the gap width, use is made of polymer buffer factor PV introduced for this purpose. Said polymer buffer factor is related according to the equation $$PV = \frac{s \cdot L_s \cdot H_s}{A_{piston}} = \frac{s \cdot (L_{sieve} + D_{sieve}) \cdot (D_{piston} \cdot \pi)}{A_{piston}}$$

to gap width s, gap length $L_s$, gap height $H_s$ and sieve area per piston $A_{piston}$ and corresponds to the ratio of the gap volume to the sieve area per piston. The length of the gap (in the longitudinal direction of the piston) corresponds to the sum of sieve diameter $D_{sieve}$ and centre spacing $L_{sieve}$ of a possible plurality of sieves; the "height" of the gap corresponds to the piston circumference. According to the invention, the stated parameters are matched such that PV assumes a value between 0.5 mm and 3 mm.

A further parameter relevant to the flushing flow is hydrodynamic bearing L/D. This signifies the ratio of the length to height of the fluid film in the gap, wherein L/D is calculated more precisely as $L_h/D_{piston}$ and $L_h = L_{sieve} + D_{sieve} + 2L_o$ is the sum of the sieve diameter and spacing and twice the oscillation range $L_o$. It has been found that the L/D ratio should preferably lie in the range between 0.6 and 3.

The specific flushing cross-section $SQ_{spec}$ can also be used as an indicator of a suitable flushing flow. The latter is related to the polymer buffer factor, but puts the number of flushing flows $n_s$ in place of gap height $H_s$ and is therefore a dimensionless parameter. A suitable value range for the specific flushing cross-section is between 0.2% and 1.5%.

As indicated in the examples shown, it is possible with the suitably dimensioned devices to achieve a comparatively high onset temperature, i.e. the lowest measured temperature at which an autocatalytic reaction occurs is higher than in the case of comparable filtering devices in the prior art (usually between 130° C. and 160° C.). The positive effects of the embodiment and process management according to the invention are also confirmed in the evaluation of the spinning behaviour. The spinning reliability is evaluated in the examples according to a scale from 1 to 5. Here, a value of 1 represents an excellent spinning reliability without any disruptions, whilst proper spinning is no longer possible at a value of 5, thread tears and large-area adhesions constantly occurring, so that it is constantly necessary to restart spinning. The spinning reliability was in the range from 1 to 2 in the case of the examples shown, which represents very good process reliability and excellent product quality. Only in the case of example 2b did frequent tears and isolated adhesions occur due to the enlarged flushing gap and the associated increased proportion of unfiltered spinning solution, which was reflected overall in a reduced spinning reliability value of 3. This is achieved by the virtually non-existent dead zones, which would promote a reaction. At the same time, a fluid loss can be completely prevented with the present method.

The invention claimed is:

1. A method for the purification of a fluid with a filtering device, which comprises a housing with at least two inlets positioned on a first axis, and at least two outlets positioned on a second axis, a slide slidably received in the housing and at least one through-flow channel extending along the first axis between the at least two inlets with at least two filters arranged symmetrically opposite one another, the first axis being transverse to the second axis, and each of the at least two inlets including one of the at least two filters, the method comprising:

directing the fluid through each of the at least two inlets positioned on the first axis and against a respective one of the at least two filters associated with the at least two inlets and into a common space in said at least one through-flow channel after the at least two filters, conveying the fluid from the common space to the at least two outlets positioned on the second axis, forming a hydrodynamic buffer in a gap between the slide and the housing with a part of the fluid that does not flow through the at least one through-flow channel, wherein the at least one through-flow channel of the slide flows into at least two symmetrically opposing sub-channels on opposing sides of the slide to the at least two outlets of the housing, and at least four flushing flows are produced in the gap between at least two inlet mouths and at least two outlet mouths of the at least one through-flow channel.

2. The method according to claim 1, wherein a flow rate of the flushing flows is essentially equal to a flow rate against the at least two filters.

3. The method according to claim 1, wherein all the flushing flows are conveyed to the at least two outlets of the housing by the gap being limited in a displacement direction of the slide by sealing elements.

4. The method according to claim 1, wherein, for variation of a flushing flow distribution, the slide is displaced essentially normal to a flow direction of the flushing flows.

5. The method according to claim 1, wherein, for variation of a flushing flow distribution, the slide is rotated with respect to the housing, through 1°-30°.

6. The method according to claim 4, wherein the displacement or a rotation of the slide is smaller than a height or a width of the mouths of the at least one through-flow, the at least two inlets and the at least two outlets, so that the fluid flow is not interrupted by the displacement or the rotation.

7. The method according to claim 4, wherein the displacement or a rotation is carried out periodically in opposite directions from a through-flow position, so that the slide swings or oscillates in the housing.

8. The method according to claim 1, wherein the slide comprises at least two through-flow channels offset with respect to one another in a sliding direction, wherein the slide is displaced just far enough for one of the through-flow channels to be completely displaced with respect to the at least two inlets and therefore closed but still communicating with the at least two outlets.

9. The method according to claim 8, wherein the through-flow channel being completely displaced with respect to the at least two inlets and therefore closed communicates at an inlet side with a back-flushing channel in the housing, wherein the filters disposed in said through-flow channel are back-flushed by an inverted flow of the fluid from the at least two outlets to the back-flushing channel.

10. The method according to claim 1, wherein the slide is displaced into a filter replacement position, wherein a filter mount of the at least one through-flow channel is disposed completely outside the housing, so that a filter mounted in the filter mount can be removed and replaced.

11. A filtering device, configured for performing a method for the purification of a fluid, the device comprising:

a housing including at least two inlets positioned on a first axis, and at least two outlets positioned on a second axis, and at least two filters, said at least two inlets each including one of said at least two filters, wherein said first axis is transverse to said second axis; and a slide slidably received in the housing and including at least one through-flow channel, wherein said at least two filters are arranged symmetrically opposite one another in said at least one through-flow channel; said housing being constructed and arranged so that the fluid proceeding from the at least two inlets of the housing respectively flows symmetrically against a respective one of the at least two filters into a common space in the at least one through-flow channel after the at least two filters, and is conveyed from the common space in the at least one through-flow channel to the at least two outlets of the housing, a part of the fluid that does not flow through the at least one through-flow channel forms a hydrodynamic buffer in a gap for the passage of a part of the fluid that is provided between the housing and the slide, and the at least one through-flow channel flows into at least two symmetrically opposing sub-channels on opposing sides of the slide to the at least one outlet of the housing; and at least four flushing flows are produced in the gap between at least two inlet mouths and at least two outlet mouths of the at least one through-flow channel.

12. The device according to claim 11, wherein in that, metallic sealing elements are provided between the slide and the housing, said sealing elements limiting the otherwise continuous gap in a sliding direction outwards.

13. The device according to claim 11, wherein the gap width is selected such that the quotient of the volume (in $mm^3$) of the gap and the sum of the filter areas (in $mm^2$) of the slide has a value of 0.5 mm to 3 mm.

14. The device according to claim 11, wherein the slide comprises at least two through-flow channels disposed essentially normal to a displacement axis of the slide.

15. The device according to claim 14, wherein a back-flushing channel is provided in the housing, said back-flushing channel communicating with one of the two through-flow channels when the slide is displaced into a back-flushing position.

16. The method according to claim 1, wherein, for variation of a flushing flow distribution, the slide is rotated with respect to the housing, through 5°-15°.

17. The device according to claim 11, wherein said housing comprises two back-flushing channels that are symmetrically opposite to each other, said back-flushing channels communicating with the at least one through-flow channel when the slide is displaced into a back-flushing position.

18. The device according to claim 14, wherein the housing comprises two back-flushing channels that are symmetrically opposite to each other, said back-flushing channels communicating with one of the two through-flow channels when the slide is displaced into a back-flushing position.

* * * * *